United States Patent
Pattanaik

(10) Patent No.: US 11,347,766 B2
(45) Date of Patent: May 31, 2022

(54) NAVIGATION OF HIERARCHICAL DATA

(71) Applicant: SAP SE, Walldorf (DE)

(72) Inventor: Monisha Pattanaik, Bhubaneswar (IN)

(73) Assignee: SAP SE, Walldorf (DE)

( * ) Notice: Subject to any disclaimer, the term of this patent is extended or adjusted under 35 U.S.C. 154(b) by 129 days.

(21) Appl. No.: 16/826,456

(22) Filed: Mar. 23, 2020

(65) Prior Publication Data
US 2021/0294815 A1    Sep. 23, 2021

(51) Int. Cl.
*G06F 16/26* (2019.01)

(52) U.S. Cl.
CPC ................... *G06F 16/26* (2019.01)

(58) Field of Classification Search
CPC ........................................... G06F 16/26
See application file for complete search history.

(56) References Cited

U.S. PATENT DOCUMENTS 8,010,909 B1 *   8/2011   Hanson ................... G06F 16/26
                                                      715/853
9,378,432 B2 *   6/2016   Shukla ............... G06K 9/00684

OTHER PUBLICATIONS

Bogdan Bele, Five Google Earth Power User Tips, Feb. 4, 2014, groovypost.com, pp. 1-3 (Year: 2014).*

* cited by examiner

*Primary Examiner* — Andrey Belousov
(74) *Attorney, Agent, or Firm* — Buckley, Maschoff & Talwalkar LLC

(57) ABSTRACT

A system includes display of a hierarchy of indicators of entity instances, reception of a selection of one of the indicators, the selected indicator of a first entity instance, in response to the selection, display of a control in conjunction with the indicator, reception of a first manipulation of the displayed control, and display, in response to the first manipulation, of an indicator of a second entity instance and a first numeral indicating a distance of the second entity instance from the first entity instance in the hierarchy.

20 Claims, 12 Drawing Sheets

NAVIGATION OF HIERARCHICAL DATA

BACKGROUND

Modern applications use large and complex data sets. The data sets are typically modeled by a schema defining data entities and their relationships with one another. Specific data associated with these data entities may be visualized (e.g., in graphs, charts, two- or three-dimensional drawings) to better understand the data. Visualizations may be generated by selecting data entities from a list and applying desired filters.

Some data entities may be hierarchical, in that one data entity (e.g., house) is a parent of and may be associated with multiple instances of another child entity (e.g., wall). Visualization applications may present instances of such entities in a tree structure representing the hierarchical relationships therebetween. FIG. 1A shows user interface 100 including entity tree 110 and visualization 120. Entity "Root Node" is selected and therefore visualization 120 includes graphical elements representing the Root Node and several child instances.

Entity tree 110 may have many sub-levels. A user may drill-down into the sub-levels to select instances residing on those levels. FIG. 1B shows entity tree 110 of user interface 100 after drilling down to select instance "Level 5D", resulting in visualization 130.

As shown, expansion of tree 110 causes the horizontal size of the tree to far exceed the space allotted to tree 110 in user interface 100. Accordingly, horizontal (and vertical) scroll bars are displayed to allow a user to view branches of tree 110 which are no longer displayed. This approach is undesirable because the user the position of the displayed instance in tree 110 is no longer easily ascertained. For example, the user is required to manipulate the scroll bars to understand the position and relationships of the displayed instance in the hierarchy (e.g., to locate the great-grandparent of the selected instance).

Systems are desired to improve navigation of hierarchical data sets within limited and/or fixed display areas.

DETAILED DESCRIPTION

The following description is provided to enable any person in the art to make and use the described embodiments. Various modifications, however, will remain readily apparent to those in the art.

Some embodiments provide a user interface (UI) component, or control, which allows a user to drill through levels of a hierarchy without losing track of a node of the hierarchy from which the drilling commenced. Embodiments may therefore address the above-described problem of excessive horizontal scrolling within a fixed display pane. According to some embodiments, the drilling behaviour of the UI component can be customized, such as by defining a number of levels to descend/ascend per drilling action, one or more entity types through which to drill, and/or one or more entity instances through which to drill.

Embodiments may benefit applications which provide simultaneous views of hierarchical data in both tabular and graphic visualization formats. Such applications may include, but are not limited to, computer-aided design applications and project management applications.

Figure 1A:
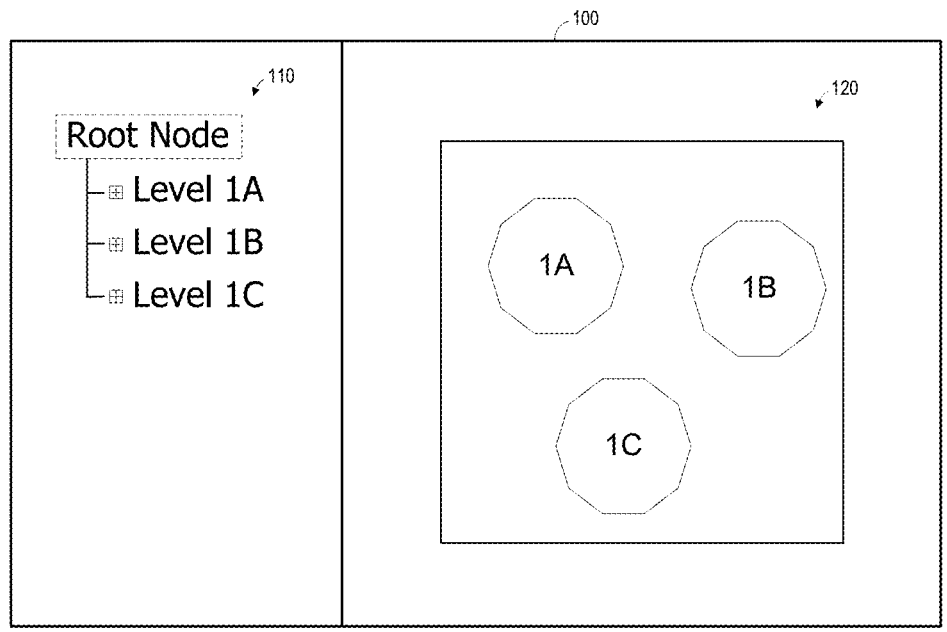
FIG. 1A is a view of a user interface for navigating hierarchical data.
Figure 1B:
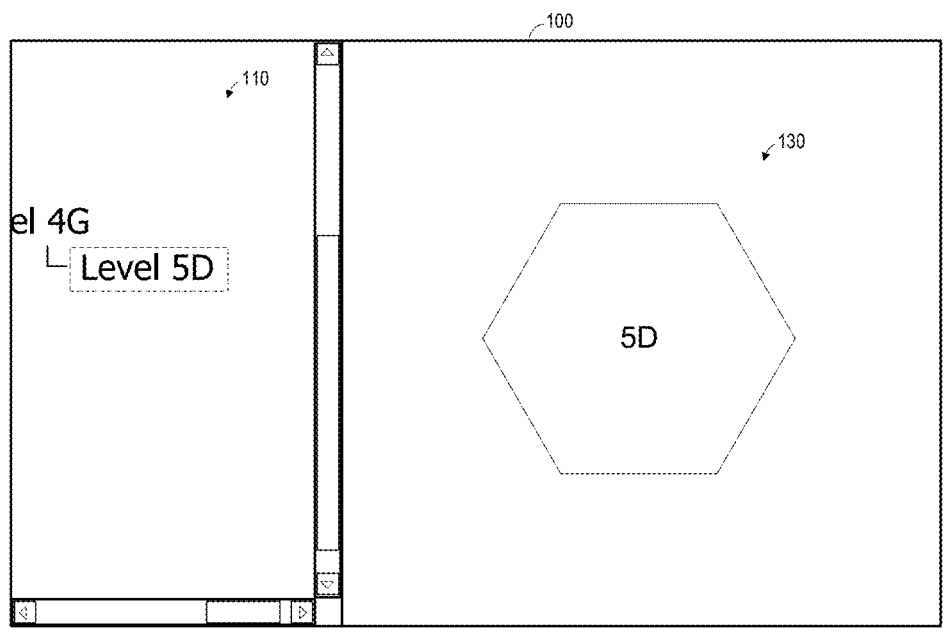
FIG. 1B is a view of a user interface for navigating hierarchical data.
Figure 2A:
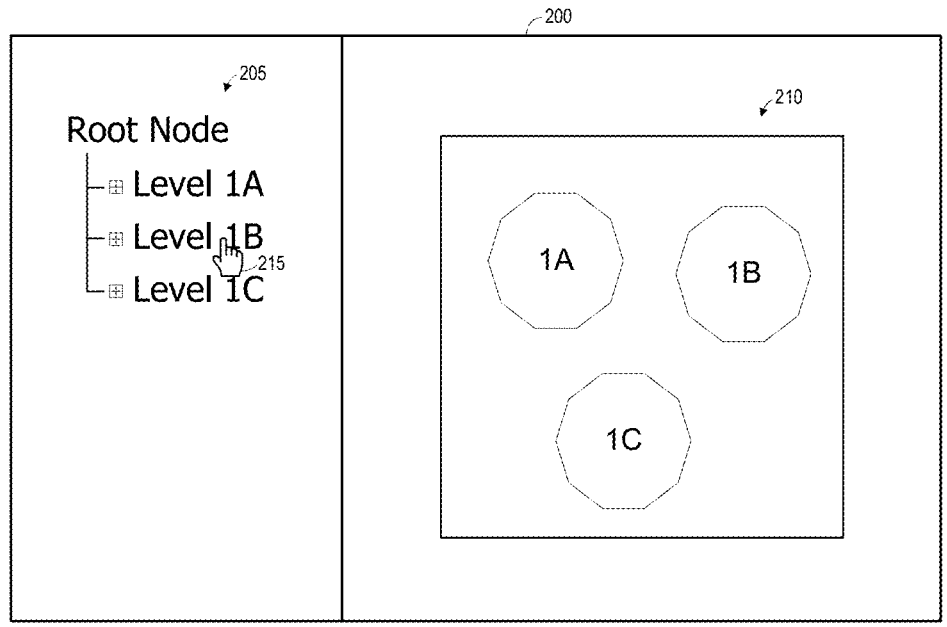
FIG. 2A is a view of a user interface for navigating hierarchical data according to some embodiments.

FIG. 2A illustrates UI 200 according to some embodiments. UI 200 may be displayed on a display device by executing program code of a software application providing data visualization.

UI 200 presents hierarchical tree 205 of data entities and corresponding visualization 210 as described above. Embodiments are not limited to any particular presentation of an entity hierarchy or of corresponding visualizations. As shown in FIG. 2A, cursor 215 has been manipulated to select the entity instance "Level 1B".

Figure 2B:
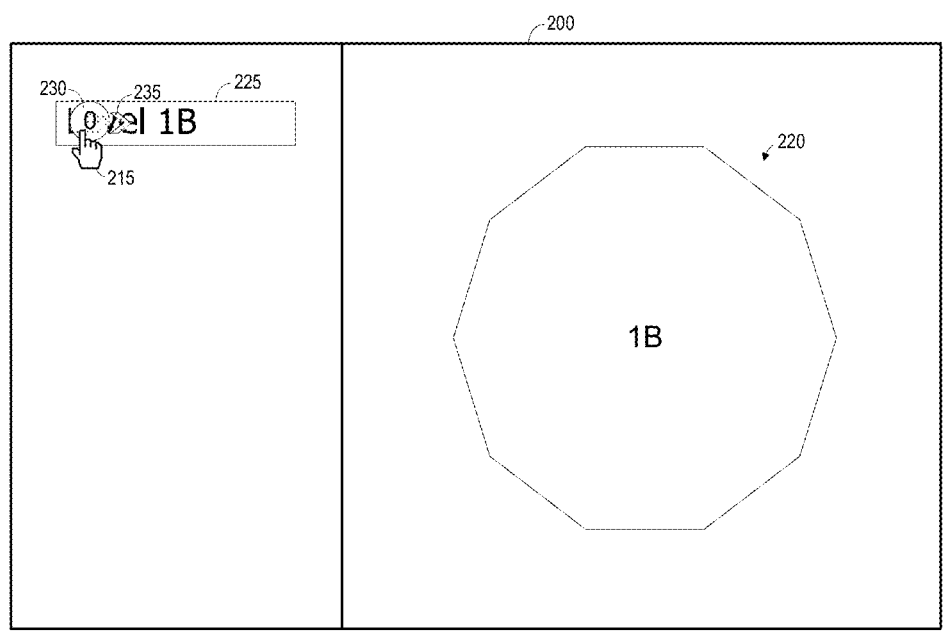
FIG. 2B is a view of a user interface for navigating hierarchical data according to some embodiments.

FIG. 2B illustrates UI 200 after selection of entity instance Level 1B according to some embodiments. UI 200 now shows zoomed-in visualization 220 of entity instance Level 1B. Selected entity instance Level 1B is highlighted by box 225 and overlaid by control 230. Control 230 includes the numeral "0" to indicate that no drill-down or drill-up from the selected instance has yet occurred. Arrow 235 is displayed adjacent to control 230 and indicates that movement of control 230 is permitted because at least one level of tree 205 is located "below" the selected instance (i.e., the user may drill down from the selected instance).

Embodiments are not limited to the specific appearance and/or locations of control 230 and arrow 234 with respect to the selected instance or to one another.

Figure 2C:
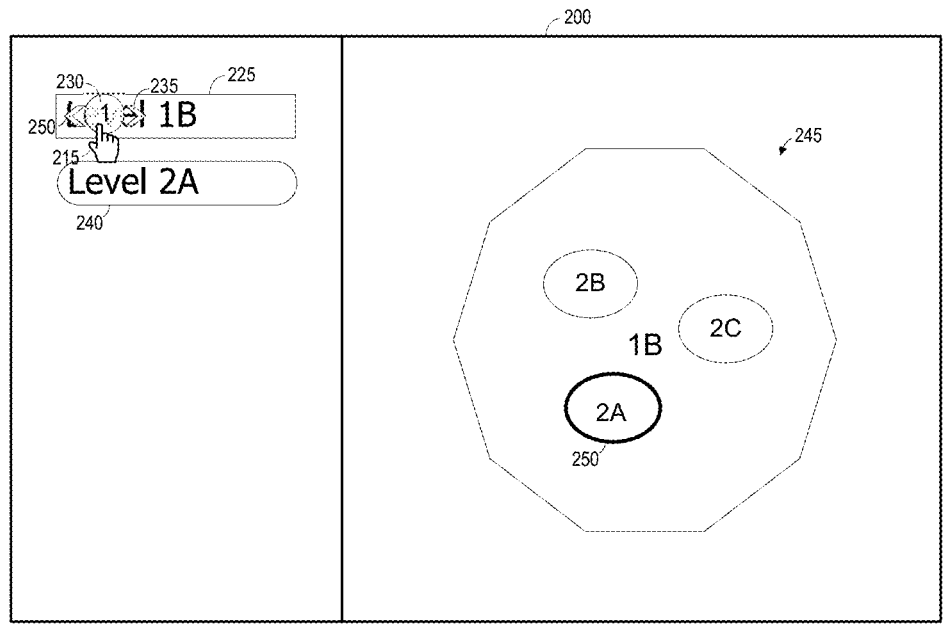
FIG. 2C is a view of a user interface for navigating hierarchical data according to some embodiments.

FIG. 2C illustrates UI 200 after a user has manipulated cursor 215 to "drag" control 230 to the right. Any suitable input metaphor, including but not limited to a click-and-drag mouse input, may be used to move control 230 to the right. According to the present example, movement to the right corresponds to drilling down to lower hierarchy levels, but embodiments are not limited thereto.

Movement to the right causes control 230 to display "1" to indicate a drill-down to a next branch in the hierarchical tree. The next branch may be a next node in a fully-expanded version of the tree (which may be a node of a sub-level of the selected node, of the same level, or a higher level), or a next node as defined by customized drill-down and drill-up filter values, as will be described below.

In the present case, the next node corresponds to entity instance "Level 2A", which is a sub-level of entity instance Level 1B. Graphical indicator 240 indicates this entity instance as the current drill-down target, and no other graphical indicators of entity instances are displayed. Also, Level 1B remains displayed in box 225 of UI 200 while graphical indicator 240 indicating Level 2A is displayed. Accordingly, the user is able to easily determine a node of the subject hierarchy from which the current drill-down began.

UI 200 displays visualization 245 including graphic 250 representing entity Level 2A. Embodiments may incorporate any degree of zoom-in to the selected entity instance.

FIG. 2C also shows arrow 235 as described above, and arrow 250 pointing to the left. Arrow 250 indicates that movement of control 230 to the left is permitted to drill-up to hierarchy levels located "above" the selected instance.

Figure 2D:
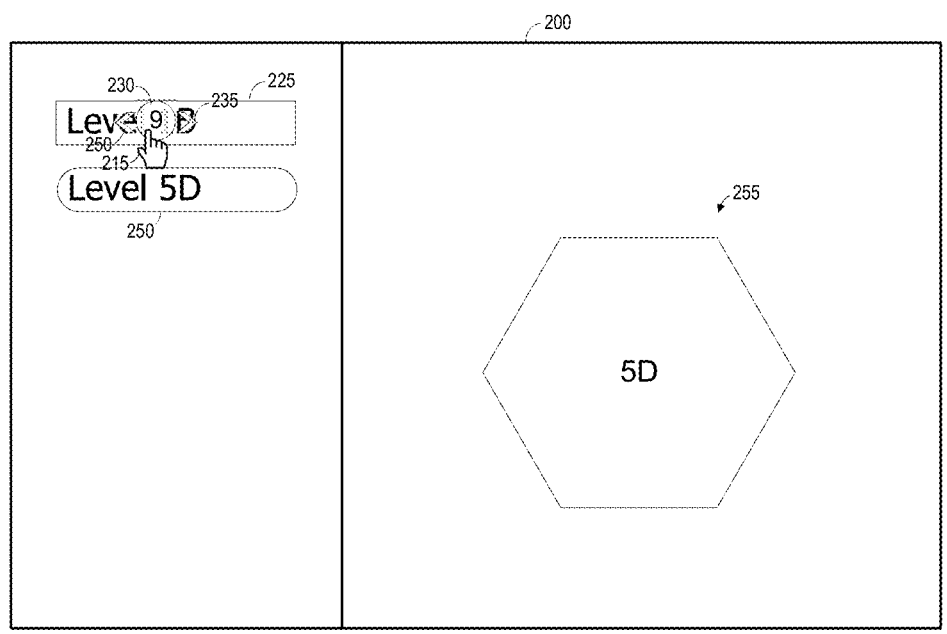
FIG. 2D is a view of a user interface for navigating hierarchical data according to some embodiments.

FIG. 2D illustrates further movement of control 230 to the right, resulting in additional drill-down actions. Control 230 displays "9" to indicate a drill-down to a ninth-furthest node from the selected node in the hierarchical tree. The ninth-furthest node may be defined according to customized drill-down and drill-up filter values, as will be described below. According to the present example, the ninth-furthest node corresponds to entity instance "Level 5D. Graphical indicator 250 indicates this entity instance as the current drill-down target, and no other graphical indicators of entity instances are displayed. Again, Level 1B remains displayed in box 225 of UI 200 while graphical indicator 250 indicating Level 5D is displayed below, allowing the user to easily determine a node of the subject hierarchy from which the current nine-level drill-down began. UI 200 displays visualization 255 representing entity Level 5D.

Figure 3:
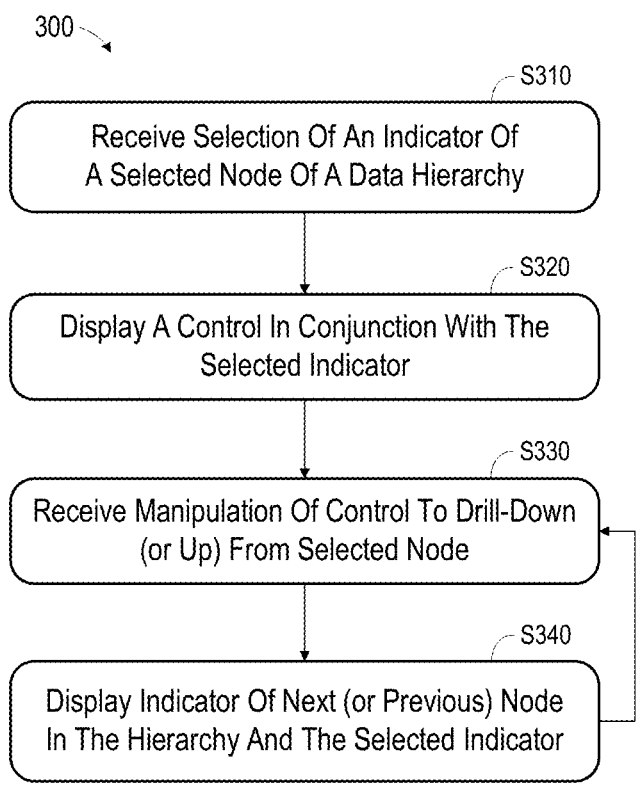
FIG. 3 is a flow diagram of a process for navigating hierarchical data according to some embodiments.

FIG. 3 comprises a flow diagram of process 300 to provide a UI control according to some embodiments. In some embodiments, various hardware elements of a client system execute program code to perform process 300. The program code may be program code of a client application for presenting user interfaces to allow interaction with a corresponding server application. According to some embodiments, the client application is a Web application executing within an execution engine of a Web browser, and the server application provides information and data in a format (e.g., JavaScript Object Notation (JSON)) which may be rendered by such a Web application.

Process 300 and all other processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, a selection of an indicator is received at S310. The indicator indicates a selected node of a data hierarchy. According to some embodiments, the data hierarchy conforms to a hierarchical schema of data entities, and instances of the data entities may be arranged in a hierarchical format conforming to the hierarchical schema. The selected node is an instance of a data entity of the schema. The indicator may comprise any graphic which may be associated with a node, and may be selected using any UI metaphor.

Figure 4A:
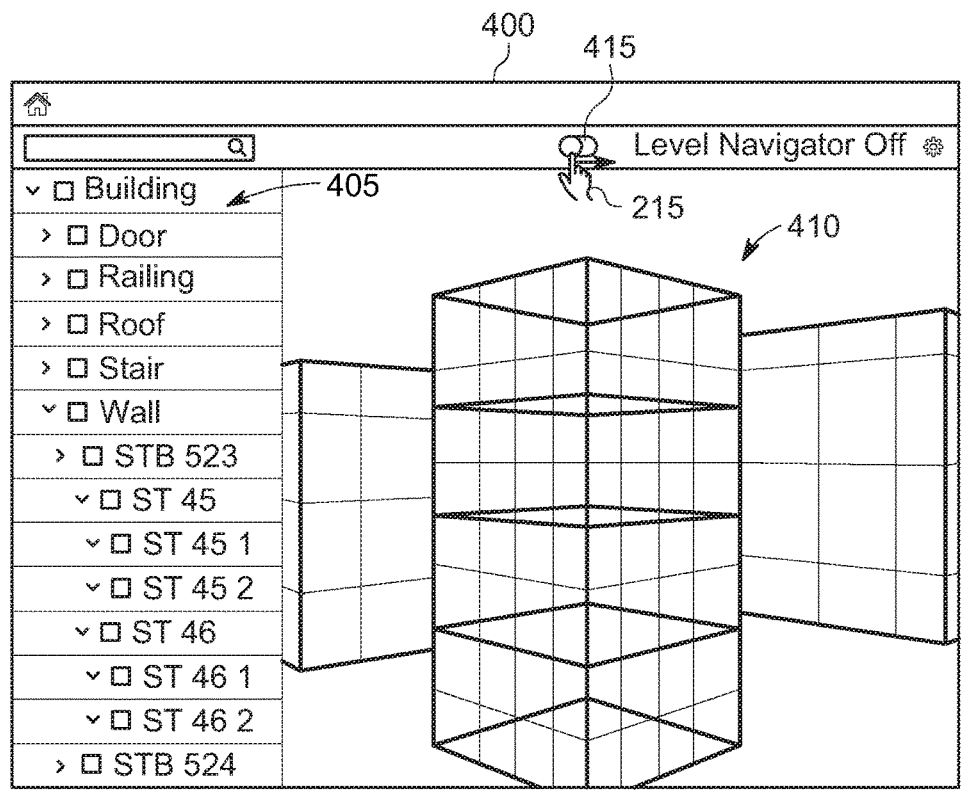
FIG. 4A is a view of a user interface for navigating hierarchical data according to some embodiments.

FIG. 4A illustrates UI 400 of a client application for purposes of describing an embodiment of process 300. Embodiments are not limited thereto. According to some embodiments, UI 400 is accessed by entering a Uniform Resource Locator (URL) associated with a desired server (e.g., cloud) application into a Web browser address bar. The Web browser accesses the URL and receives source code of a client Web application in response. The client Web application includes code which is executable to render UI 400 based on information received from the server application.

UI 400 may comprise a UI of a construction-focused computer-aided design application. Tree 405 includes indicators of entity instances conforming to a hierarchical schema. Visualization 410 corresponds to the root node "Building" of tree 405.

UI 400 includes control 415 to activate functionality as described herein. Embodiments are not limited to such a control. Cursor 215 is shown manipulating control 415 to activate such functionality.

Figure 4B:
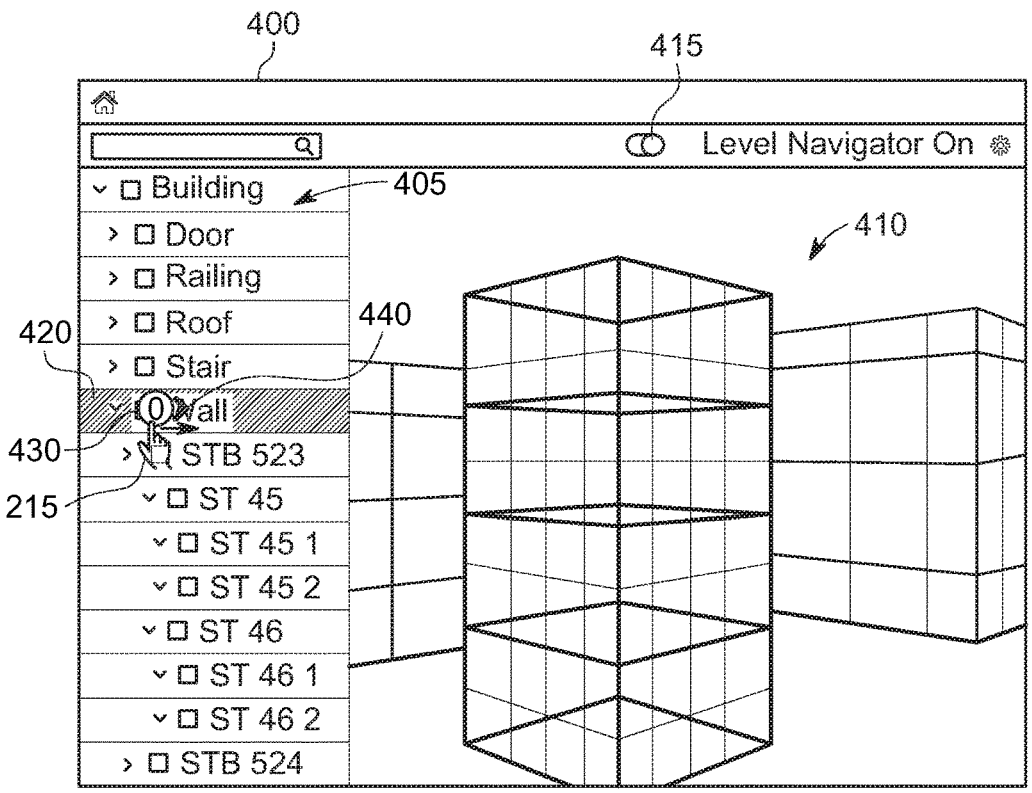
FIG. 4B is a view of a user interface for navigating hierarchical data according to some embodiments.

Returning to process 300, FIG. 4B illustrates S310 according to some embodiments. Control 415 is set to an On position and Cursor 215 is manipulated to select indicator 420 of node/instance "Wall" of tree 405. In response, at S320, control 430 is displayed in conjunction with indicator 420. Control 430 includes the numeral "0" to indicate that no drill-down or drill-up from the selected instance has yet occurred. As described above, arrow 440 is displayed adjacent to control 430 and indicates that movement of control 430 to the right is permitted because at least one level of tree 405 is located "below" the selected instance. Visualization 410 comprises a visualization of the selected instance and, in some embodiments, all child instances of the selected instance.

Figure 4C:
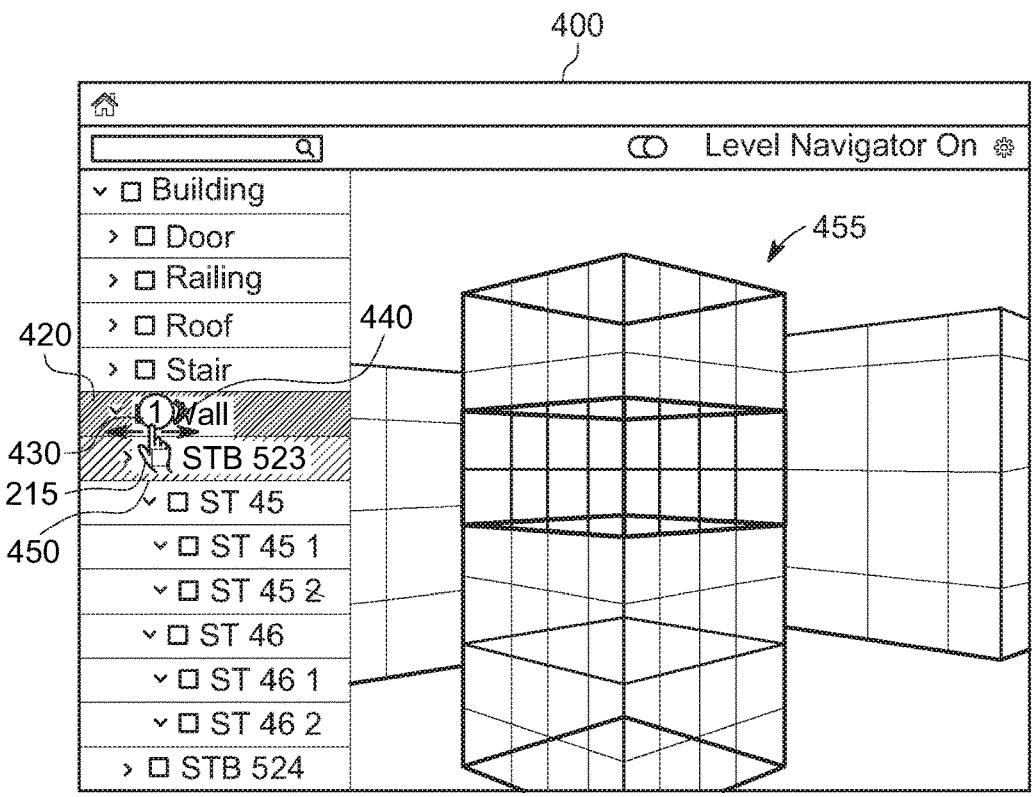
FIG. 4C is a view of a user interface for navigating hierarchical data according to some embodiments.

Next, a manipulation of the control is received at S330. The manipulation comprises an instruction to drill-down (or up) from the selected node. For example, FIG. 4C illustrates manipulation of control 430 by cursor 215 to move control 430 to the right. In response to the manipulation, an indicator of a next or previous node in the hierarchy is displayed at S340. Also displayed at S340 is the originally-selected indicator.

Continuing with the example of FIG. 4C, movement of control 430 to the right causes control 430 to display "1" to indicate a drill-down to node "STB 523", which is now highlighted by indicator 450. Indicator 420 continues to indicate selected node Wall. Moreover, and in response, UI 400 displays visualization 455 in which instance STB 523 is highlighted. The appearance of the control, the manner of manipulation of the control, and the response of the control to the manipulation are not limited to the described examples.

Figure 4D:
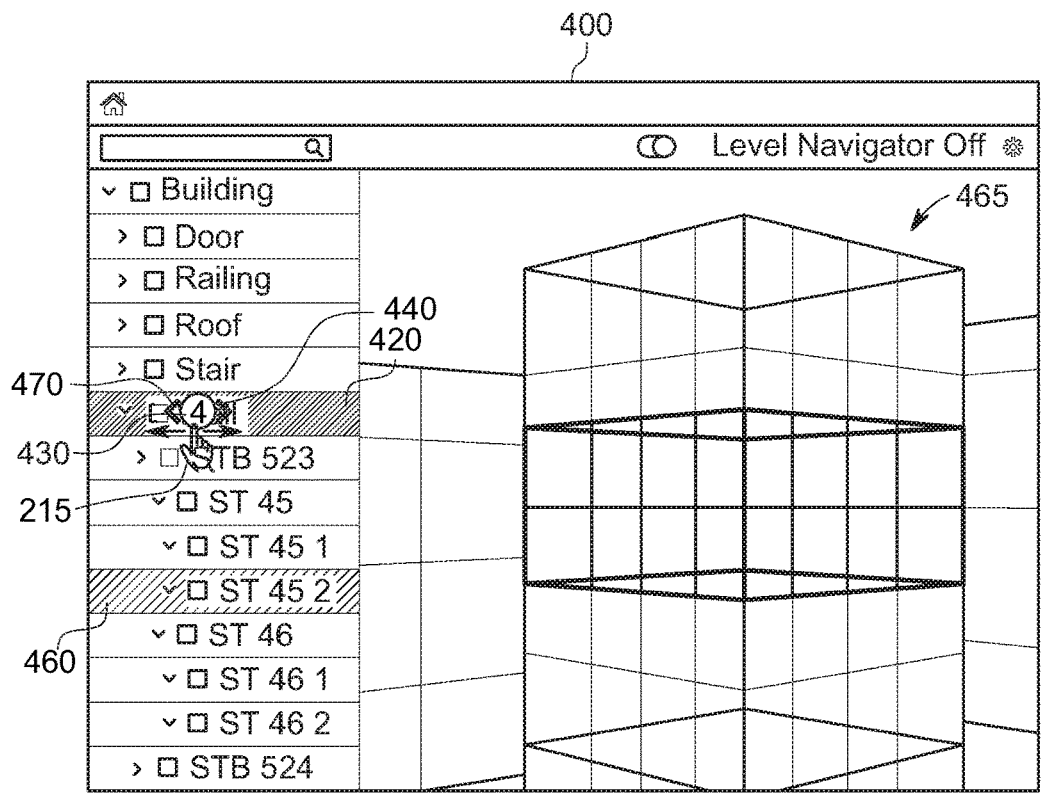
FIG. 4D is a view of a user interface for navigating hierarchical data according to some embodiments.

Flow returns from S340 to S330 to await further manipulation of the control. FIG. 4D illustrates UI 400 after further manipulation of control 430. As shown, cursor 215 has moved control 430 further to the right, causing control 430 to display "4". This indicates a drill-down to node "ST 45 2", which is four nodes below the selected node in the fully-expanded tree, and which is now highlighted by indicator 460 at S340. Indicator 420 continues to indicate selected node Wall. UI 400 now displays zoomed-in visualization 465 in which instance ST 45 2 is highlighted. In this regard, embodiments may zoom in as navigation proceeds deeper into the tree in order to better represent the current target instance in the UI frame. For example, the zoom setting may ensure that the current target instance consumes at least 50% of the visualization display area.

Figure 5:
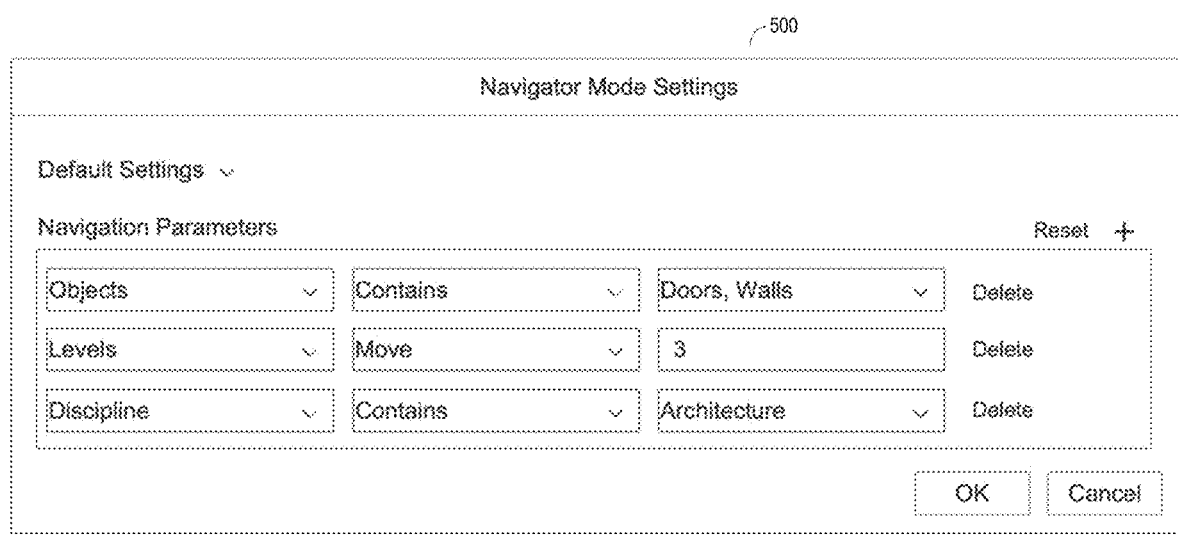
FIG. 5 is a view of a user interface for setting parameters associated with navigation behavior according to some embodiments.

FIG. 5 illustrates user interface 500 which may be invoked by a user to specify parameter values customizing the behavior of the above-described functionality. Generally, the parameter values may indicate the drill-down and drill-up behavior of some embodiments. For example, the Objects parameter defines the node instances which will participate in the drill-down or drill-up, i.e., all other node instances will be ignored/skipped over. Similarly, the Levels parameter indicates how many nodes will be skipped per movement of the above-described control. Finally, the Discipline parameter is another filter relating to the type of node instance. Embodiments may include any other suitable parameters for specifying drill-down and drill-up behavior. The parameter values may be applied universally during operation or may be user-specific.

Figure 6A:
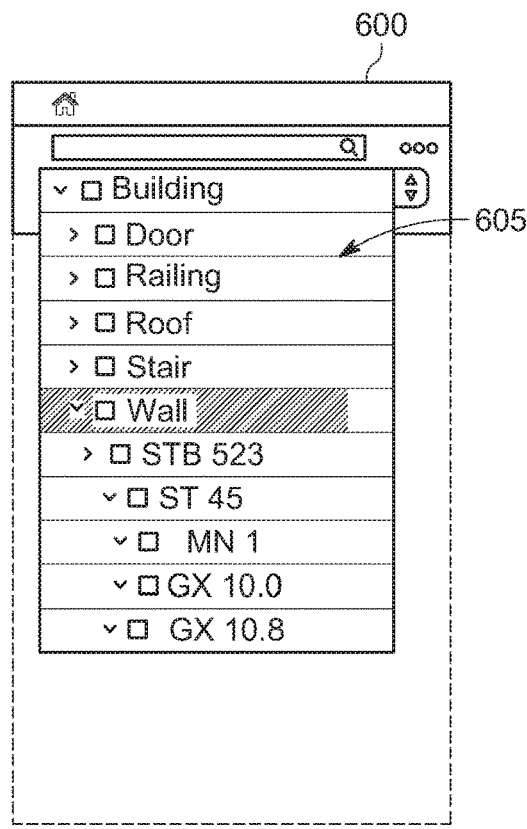
FIG. 6A is a view of a limited-area user interface for navigating hierarchical data according to some embodiments.

FIGS. 6A through 6E illustrate an embodiment deployed on a mobile device or other device with limited display area. UI 600 of FIG. 6A shows hierarchical tree 605 including indicators of entity instances conforming to a hierarchical schema.

Figure 6B:
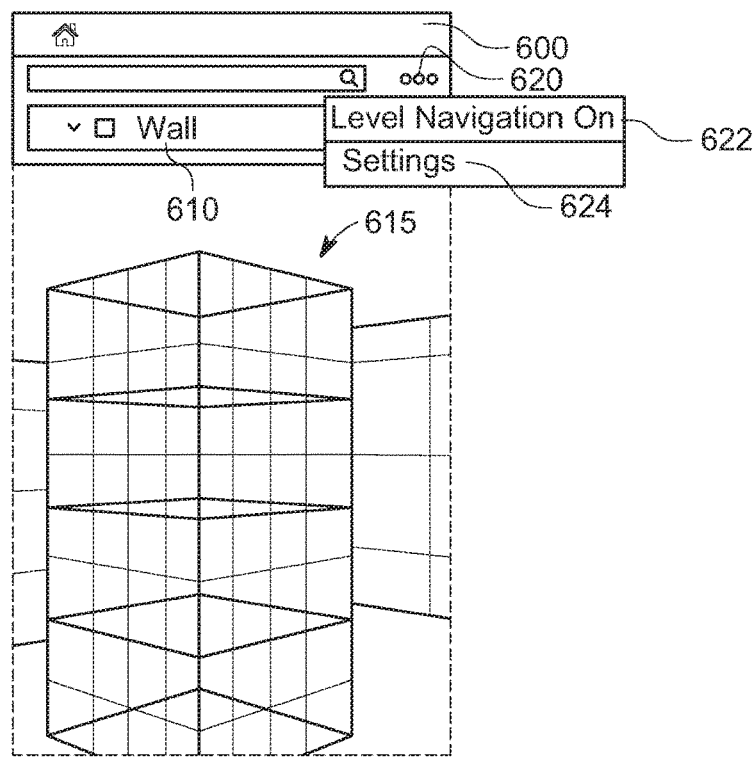
FIG. 6B is a view of a limited-area user interface for navigating hierarchical data according to some embodiments.

FIG. 6B shows selection of node "Wall" 610 from tree 605 and corresponding visualization 610. Also shown is control 620 which has been selected to display menu options 622 and 624. According to the present example, option 622 allows activation of UI functionality as described herein, while option 624 provides access to parameter values such as those described with respect to FIG. 5.

Figure 6C:
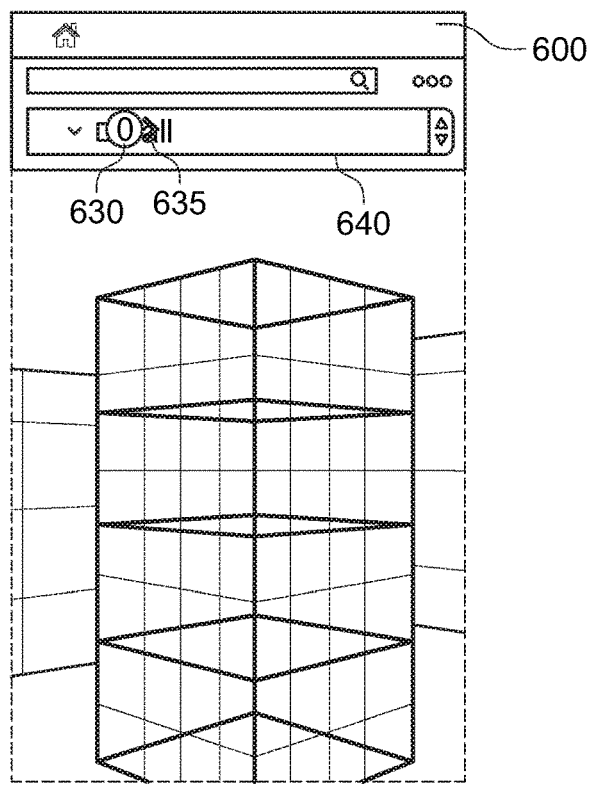
FIG. 6C is a view of a limited-area user interface for navigating hierarchical data according to some embodiments.

It will be assumed that option 622 is selected, resulting in UI 600 of FIG. 6C. UI 600 of FIG. 6C includes control 630 displayed in conjunction with indicator 640 of the selected Wall instance. Control 630 includes the numeral "0" to indicate that no drill-down or drill-up from the selected instance has yet occurred, and arrow 635 is displayed adjacent to control 630.

Figure 6D:
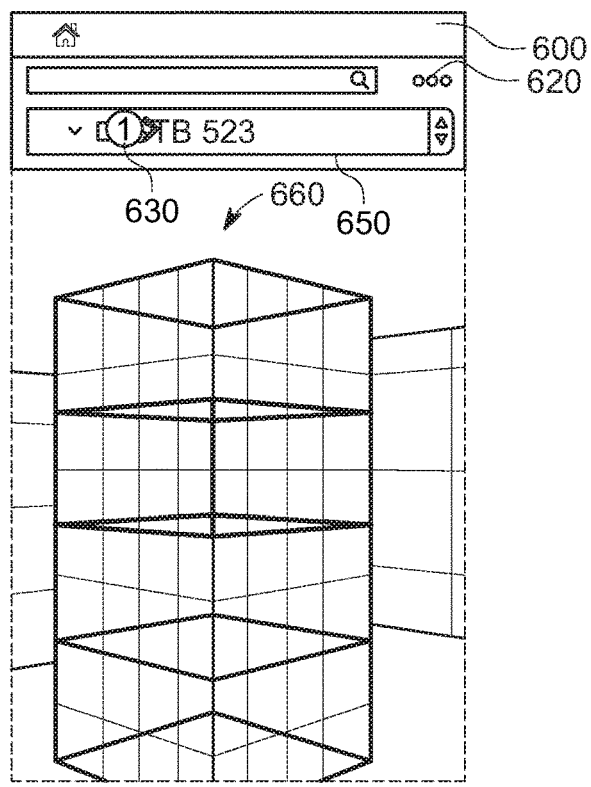
FIG. 6D is a view of a limited-area user interface for navigating hierarchical data according to some embodiments.

FIG. 6D illustrates manipulation to move control 630 to the right. In response to the manipulation, indicator 650 of next node "STB 523" is presented and control 630 displays "1". Visualization 660 is also displayed, in which instance STB 523 is highlighted.

Figure 6E:
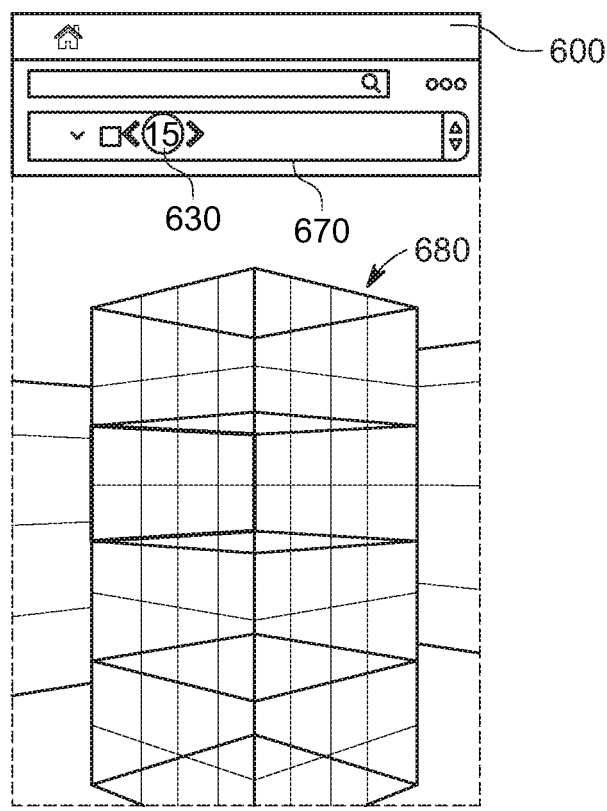
FIG. 6E is a view of a limited-area user interface for navigating hierarchical data according to some embodiments.

FIG. 6E illustrates UI 600 after further manipulation of control 630. Control 630 has been moved further to the right, causing control 630 to display "15". This indicates a drill-down to node "G.K. 10.8", which is fifteen nodes below the selected node in the fully-expanded tree, and which is now highlighted by indicator 670 of FIG. 6E. UI 600 now displays visualization 680 in which instance G.K. 10.8 is highlighted.

Figure 7:
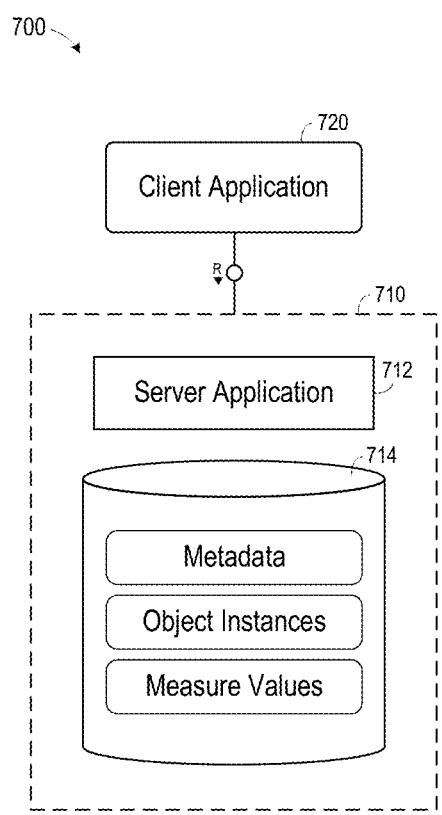
FIG. 7 is a block diagram of an architecture providing hierarchical data navigation according to some embodiments.

FIG. 7 is a block diagram of architecture 700 for implementing some embodiments. Embodiments are not limited to architecture 700 or to a client-server database architecture.

Architecture 700 includes data server 710 and client 720. Generally, data server 710 receives requests from client 720 and provides results to client 720 based on those requests. Server application 712 may be separated from or closely integrated with data store 714. Server application 712 may be executed completely on the database platform of data store 714, without the need for an additional server. Architecture 700 may be implemented using any client-server architecture that is or becomes known, including but not limited to on-premise, cloud-based and hybrid architectures.

In one specific example, client 720 executes an application to present a user interface to a user. The user defines a query using the user interface, and client 720 forwards a request based on the query to server 710. Server application 712 generates an SQL script based on the request and forwards the SQL script to data store 714. Data store 714 executes the SQL script to return a result set based on data of data store 714, and client 720 generates and displays a report/visualization based on the result set.

Data store 714 stores metadata, object instances, and measure values. Generally, the metadata defines one or more data models, each of which includes data objects arranged in a hierarchical schema. The stored object instances and measure values comprise data representing actual (i.e., instantiated) versions of those objects. The metadata also associates each measure and object with one or more physical entities (e.g., a physical database table, associated columns of one or more database tables).

The data of data store 714 may comprise one or more of conventional tabular data, row-based data, column-based data, and object-based data. Moreover, the data may be indexed and/or selectively replicated in an index to allow fast searching and retrieval thereof. Data store 714 may support multi-tenancy to separately support multiple unrelated clients by providing multiple logical database systems which are programmatically isolated from one another.

Data store 714 may comprise any query-responsive data source or sources that are or become known, including but not limited to a structured-query language (SQL) relational database management system. Data store 714 may comprise a relational database, a multi-dimensional database, an eXtendable Markup Language (XML) document, or any other data storage system storing structured and/or unstructured data. The data of data store 714 may be distributed among several relational databases, dimensional databases, and/or other data sources. Embodiments are not limited to any number or types of data sources.

Data store 714 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Client 720 may comprise one or more devices executing program code of an application for presenting user interfaces to allow interaction with server 710. The user interfaces may be suited for reporting, data analysis, and/or any other functions based on the data of data store 714.

Figure 8:
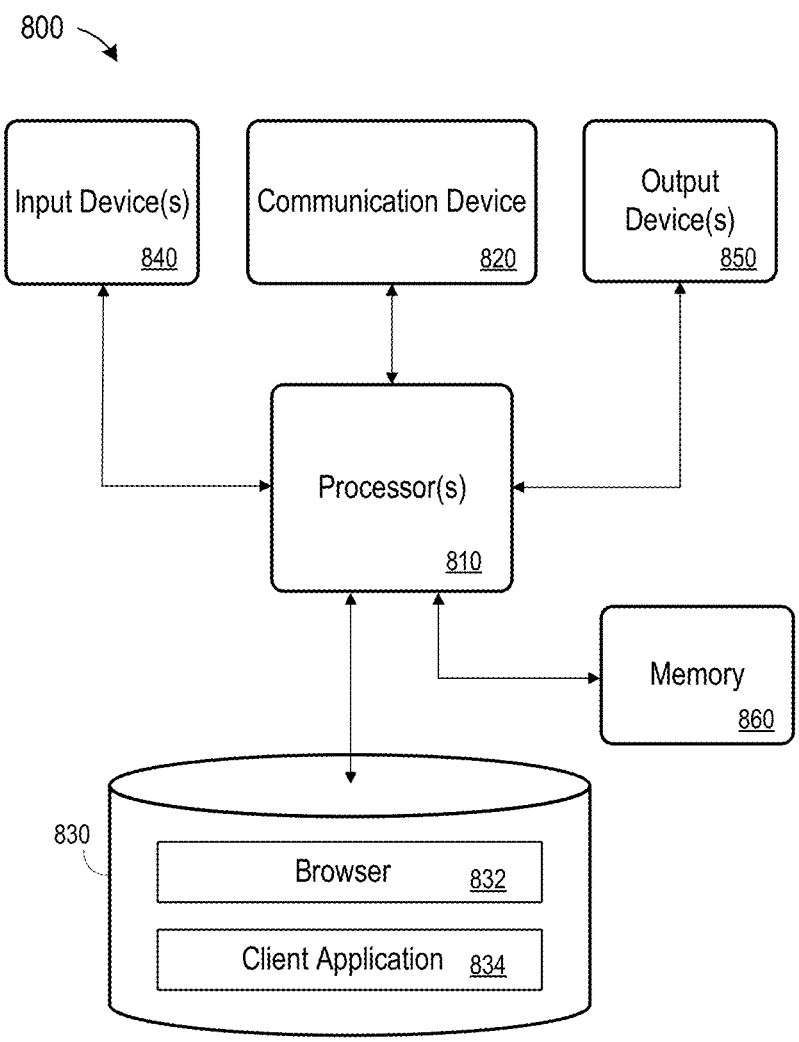
FIG. 8 is a block diagram of a client system according to some embodiments.

FIG. 8 is a block diagram of apparatus 800 according to some embodiments. Apparatus 800 may comprise a general-purpose computing apparatus and may execute program code to perform any of the functions described herein. Apparatus 800 may comprise an implementation of client 720 of FIG. 7 in some embodiments. Apparatus 800 may include other unshown elements according to some embodiments.

Apparatus 800 includes processor(s) 810 operatively coupled to communication device 820, data storage device 830, one or more input devices 840, one or more output devices 850 and memory 860. Communication device 820 may facilitate communication with external devices, such as a reporting client, or a data storage device. Input device(s) 840 may comprise, for example, a keyboard, a keypad, a mouse or other pointing device, a microphone, knob or a switch, an infra-red (IR) port, a docking station, and/or a touch screen. Input device(s) 840 may be used, for example, to enter information into apparatus 800. Output device(s) 850 may comprise, for example, a display (e.g., a display screen) a speaker, and/or a printer.

Data storage device 830 may comprise any appropriate persistent storage device, including combinations of magnetic storage devices (e.g., magnetic tape, hard disk drives and flash memory), optical storage devices, Read Only Memory (ROM) devices, etc., while memory 860 may comprise Random Access Memory (RAM), Storage Class Memory (SCM) or any other fast-access memory.

Browser 832 and client application 834 may comprise program code executed by processor 810 to cause apparatus 800 to perform any one or more of the processes described herein. Embodiments are not limited to execution of these processes by a single apparatus. Data storage device 830 may also store data and other program code for providing additional functionality and/or which are necessary for operation of apparatus 800, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A device comprising:
    a display;
    a memory storing processor-executable process steps; and
    a processor to execute the processor-executable process steps to cause the device to:
        display a hierarchy of indicators of entity instances on the display;
        receive a selection of one of the indicators, the selected indicator of a first entity instance;
        in response to the selection, display a control in conjunction with the indicator on the display;
        receive a first manipulation of the displayed control; and
        in response to the first manipulation, display an indicator of a second entity instance and a first numeral indicating a hierarchical distance of a number of hierarchy levels separating the second entity instance from the first entity instance in the hierarchy.

2. A device according to claim 1, the processor to execute the processor-executable process steps to cause the device to:
    receive a second manipulation of the displayed control; and
    in response to the second manipulation, display an indicator of a third entity instance and a second numeral indicating a hierarchical distance of a number of hierarchy levels separating the third entity instance from the first entity instance in the hierarchy.

3. A device according to claim 1, wherein the selected indicator of the first entity instance, the indicator of the second entity instance, and no other of the hierarchy of indicators of entity instances are displayed.

4. A device according to claim 1, the processor to execute the processor-executable process steps to cause the device to:
    in response to the first manipulation, display a visualization of the second entity instance while the selected indicator of the first entity instance and the indicator of the second entity instance are displayed.

5. A device according to claim 1, the processor to execute the processor-executable process steps to cause the device to:
    in response to the first manipulation, determine a number of entity instances to skip to identify second entity instance.

6. A device according to claim 5, the processor to execute the processor-executable process steps to cause the device to:
    in response to the first manipulation, determine one or more types of entity instances to skip to identify second entity instance.

7. A system according to claim 1, the processor to execute the processor-executable process steps to cause the system to:
    in response to the first manipulation, determine one or more types of entity instances to skip to identify second entity instance.

8. A computer-implemented method comprising:
    displaying a hierarchy of indicators of entity instances;
    receiving a selection of one of the indicators, the selected indicator of a first entity instance;
    in response to the selection, displaying a user interface control overlaid on the indicator;
    receiving a first manipulation of the displayed user interface control; and
    in response to the first manipulation, displaying an indicator of a second entity instance and a first numeral indicating a hierarchical distance of a number of hierarchy levels separating the second entity instance from the first entity instance in the hierarchy.

9. A method according to claim 8, further comprising:
receiving a second manipulation of the displayed control; and
in response to the second manipulation, displaying an indicator of a third entity instance and a second numeral indicating a hierarchical distance of a number of hierarchy levels separating the third entity instance from the first entity instance in the hierarchy.

10. A method according to claim 8, wherein the selected indicator of the first entity instance, the indicator of the second entity instance, and no other of the hierarchy of indicators of entity instances are displayed.

11. A method according to claim 8, further comprising:
in response to the first manipulation, displaying a visualization of the second entity instance while the selected indicator of the first entity instance and the indicator of the second entity instance are displayed.

12. A method according to claim 8, further comprising:
in response to the first manipulation, determining a number of entity instances to skip to identify second entity instance.

13. A method according to claim 12, further comprising:
in response to the first manipulation, determining one or more types of entity instances to skip to identify second entity instance.

14. A method according to claim 8, further comprising:
in response to the first manipulation, determining one or more types of entity instances to skip to identify second entity instance.

15. A non-transitory computer-readable medium storing processor-executable process steps executable to cause:
display of a hierarchy of indicators of entity instances;
reception of a selection of one of the indicators, the selected indicator of a first entity instance;
in response to the selection, display of a control in conjunction with the indicator;
reception of a first manipulation of the displayed control; and
in response to the first manipulation, display of an indicator of a second entity instance and a first numeral indicating a hierarchical distance of a number of hierarchy levels separating the second entity instance from the first entity instance in the hierarchy.

16. A non-transitory computer-readable medium according to claim 15, the processor-executable process steps further executable to cause:
reception of a second manipulation of the displayed control; and
in response to the second manipulation, display of an indicator of a third entity instance and a second numeral indicating a hierarchical distance of a number of hierarchy levels separating the third entity instance from the first entity instance in the hierarchy.

17. A non-transitory computer-readable medium according to claim 15, wherein the selected indicator of the first entity instance, the indicator of the second entity instance, and no other of the hierarchy of indicators of entity instances are displayed.

18. A non-transitory computer-readable medium according to claim 15, the processor-executable process steps further executable to cause:
in response to the first manipulation, display of a visualization of the second entity instance while the selected indicator of the first entity instance and the indicator of the second entity instance are displayed.

19. A non-transitory computer-readable medium according to claim 15, the processor-executable process steps further executable to cause:
in response to the first manipulation, determination of a number of entity instances to skip to identify second entity instance.

20. A non-transitory computer-readable medium according to claim 19, the processor-executable process steps further executable to cause:
in response to the first manipulation, determination of one or more types of entity instances to skip to identify second entity instance.

* * * * *